United States Patent
Lee et al.

(10) Patent No.: US 7,835,095 B2
(45) Date of Patent: Nov. 16, 2010

(54) APPARATUS AND METHOD OF SETTING UP BIT ERROR RATE CRITERION AND APPARATUS AND METHOD OF PERFORMING BURN-IN TEST OF HARD DISK DRIVE

(75) Inventors: Sang-hyub Lee, Suwon-si (KR); Hae-jung Lee, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 326 days.

(21) Appl. No.: 12/042,602

(22) Filed: Mar. 5, 2008

(65) Prior Publication Data

US 2008/0219117 A1    Sep. 11, 2008

(30) Foreign Application Priority Data

Mar. 9, 2007  (KR) ............ 10-2007-0023676

(51) Int. Cl.
*G11B 27/36* (2006.01)
*G11B 5/09* (2006.01)

(52) U.S. Cl. .................................... 360/31; 360/53
(58) Field of Classification Search ............ 360/31, 360/53
See application file for complete search history.

(56) References Cited

U.S. PATENT DOCUMENTS

| | | | | |
|---|---|---|---|---|
| 6,972,920 | B2* | 12/2005 | Kim et al. | 360/75 |
| 7,583,465 | B2* | 9/2009 | Park et al. | 360/75 |
| 2005/0078393 | A1* | 4/2005 | Cho | 360/31 |
| 2008/0130154 | A1* | 6/2008 | Mettler et al. | 360/53 |

FOREIGN PATENT DOCUMENTS

| | | |
|---|---|---|
| JP | 10-334402 | 12/1998 |
| JP | 2002-288822 | 10/2002 |
| KR | 88-3321 | 5/1988 |
| KR | 2004-52030 | 6/2004 |

* cited by examiner

*Primary Examiner*—Daniell L Negrón
*Assistant Examiner*—Regina N Holder
(74) *Attorney, Agent, or Firm*—Stanzione & Kim LLP

(57) ABSTRACT

An apparatus and method of setting up a bit error rate (BER) criterion and an apparatus and method of performing a burn-in test using the method of setting up the BER criterion. The method of setting the BER criterion includes measuring temperatures of hard disc drives (HDDs), and changing a BER criterion in which, if the measured temperature of the HDD is higher than an optimum temperature for a burn-in test, a new BER criterion having a value greater than the BER criterion of the optimum temperature is set up, and, if the measured temperature of the HDD is lower than an optimum temperature for a burn-in test, a new BER criterion having a value less than the BER criterion of the optimum temperature is set up.

15 Claims, 4 Drawing Sheets

APPARATUS AND METHOD OF SETTING UP BIT ERROR RATE CRITERION AND APPARATUS AND METHOD OF PERFORMING BURN-IN TEST OF HARD DISK DRIVE

CROSS-REFERENCE TO RELATED APPLICATIONS

This application claims the benefit of Korean Patent Application No. 10-2007-0023676, filed on Mar. 9, 2007, in the Korean Intellectual Property Office, the disclosure of which is incorporated herein in its entirety by reference.

BACKGROUND OF THE INVENTION

1. Field of the Invention

The present general inventive concept relates to a hard disc drive (HDD) apparatus, and more particularly, to an apparatus and method of setting up a bit error rate (BER) criterion to examine a quality of a HDD, and an apparatus and method of performing a burn-in test of the HDD.

2. Description of the Related Art

Hard disc drives are data storage devices employed in electronic devices such as computers, MP3 players, or mobile phones. Conventionally, data are recorded on concentric tracks formed on a surface of a magnetic disc, which is a data storage medium in a hard disc drive (HDD). The magnetic disc is mounted to be able to rotate at a high speed on a spindle motor, and data are reproduced or recorded by a magnetic head provided on an end of a head stack assembly (HSA). The magnetic head reproduces data by detecting magnetic changes of a particular track of the surface of the magnetic disc on which data are recorded. Also, when a write signal corresponding to the data is inputted to the magnetic head, a magnetic field is formed to magnetize a particular track of the surface of the disc, thereby, recording data on the particular track of the disc.

Conventionally, HDDs are manufactured through a part assembly process, a servo write process, a function test process, and a burn-in test process. When passing the burin-in test, the HDD are finally checked in terms of whether the manufactured HDDs have a defect or not before the manufacturing process of the HDDs is completed. In the part assembly process, parts of the HDD are assembled, and in the servo write process, a servo write pattern for controlling the rotation of the HSA is recorded on the disc. Also, in the function test process, part portions and circuit portions are coupled, and in the burn-in test process, parameters for driving the HDD are set-up, and products having poor data recording and reproducing performance are separated through various tests.

In the burn-in test process, a bit error rate (BER) which is an error rate of recording/reproducing data of an HDD is measured, and each of the HDDs must pass a certain level of BER to complete the manufacturing process. A criterion value of BER to determine a high quality and a low quality of the HDD is a BER criterion. However, in the conventional burn-in test process, a certain BER criterion is used according to the type of HDDs regardless of a temperature of the HDDs. Thus, if the temperature of the HDD is higher than an optimum temperature for the burn-in test, substantially low quality products are classified as high quality products, thereby reducing performance reliability of the products. Also, if the temperature of the HDD is lower than the optimum temperature for the burn-in test, substantially high quality products are classified as low quality products, thereby reducing productivity and increasing manufacturing costs.

SUMMARY OF THE INVENTION

The present invention provides an apparatus and method of setting up a bit error rate (BER) criterion in which the BER criterion is changed in connection with temperatures of hard disc drives (HDDs), and an apparatus and method of performing a burn-in test using the BER criterion set up method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of setting up a bit error rate (BER) criterion, the method including measuring temperatures of hard disc drives (HDDs), and changing a BER criterion in which, if the measured temperature of a HDD is higher than an optimum temperature for a burn-in test, a new BER criterion having a value greater than the BER criterion of the optimum temperature is set up, and, if the measured temperature of the HDD is lower than an optimum temperature for a burn-in test, a new BER criterion having a value smaller than the BER criterion of the optimum temperature is set up.

The measuring of the temperature of the HDD may be performed using a temperature sensor provided in the HDD.

The foregoing and/or other aspects and utilities of the present general inventive concept may also be achieved by providing a method of performing a burn-in test of hard disc drive (HDD), the method including measuring temperatures of at least an HDD, changing a BER criterion in which a new BER criterion having a value greater than the BER criterion of the optimum temperature is set up if the measured temperature of the HDD is higher than an optimum temperature for a burn-in test, and a new BER criterion having a value less than the BER criterion of the optimum temperature is set up if the measured temperature of the HDD is lower than an optimum temperature for a burn-in test, calculating a BER of the HDD, and classifying the HDD into a low quality product if the calculated BER of the HDD is less than the newly set up BER criterion, and a high quality product when the calculated BER of the HDD is equal to or greater than the newly set up BER criterion.

A plurality of HDDs may be uploaded onto a burn-in test apparatus, and each of the above operations is performed on the respective HDDs.

The foregoing and/or other aspects and utilities of the present general inventive concept may also be achieved by providing a method of testing an HDD in an HDD apparatus, the method including measuring a temperature of an HDD, and adjusting a BER criterion according to the measured temperature of the HDD and a reference temperature to be used to test a state of the HDD.

The method may further include performing a burn-in test on the HDD to determine the state of the HDD.

The performing of the burn-in test may include calculating a BER according to the adjusted BER criterion.

The calculating of the BER may include recording data of the calculated BER in one or more bit cells of a disc of the HDD, reproducing the recorded data from the one or more bit cells, and counting one or more bit cells to contain an error.

The method may further include classifying the HDD as one of a high quality HDD and a low quality HDD according to the counted one or more bit cells.

The measuring of the temperature of the HDD may include measuring the temperature using a temperature sensor disposed inside the HDD before performing a burn-in test.

The foregoing and/or other aspects and utilities of the present general inventive concept may also be achieved by providing an HDD apparatus, including a member to define an inside space, and having a disc and an HSA to read data and record data from and on the disc, a temperature sensor disposed in the inside space of the member to detect an internal temperature of an HDD, and a controller to adjust a BER criterion according to the measured temperature of the HDD and a reference temperature to be used to test a state of the HDD The controller may perform a burn-in test on the HDD to determine the state of the HDD.

The controller may calculate a BER according to the adjusted BER criterion.

The controller may record data of the calculated BER in one or more bit cells of a disc of the HDD, reproduce the recorded data from the one or more bit cells, and count one or more bit cells to contain an error, so as to determine the state of the HDD.

The controller may classify the HDD as one of a high quality HDD and a low quality HDD according to the counted one or more bit cells.

The temperature sensor may be mounted on the HSA to detect the temperature representing an ambient air temperature between the HSA and the disc.

The temperature sensor may be disposed adjacent to the HSA to detect the temperature representing an ambient air temperature between the HSA and the disc.

The controller may calculate a BER according to the adjusted BER criterion and generate a signal representing the state of the HDD according to the calculated BER and a reference.

The controller may generate a signal representing the state of the HDD according to the adjusted BER and a reference.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 is a graph illustrating a rate of determining a high quality of an HDD according to the burn-in test temperature; and.

DETAILED DESCRIPTION OF THE PREFERRED EMBODIMENTS

Figure 1:
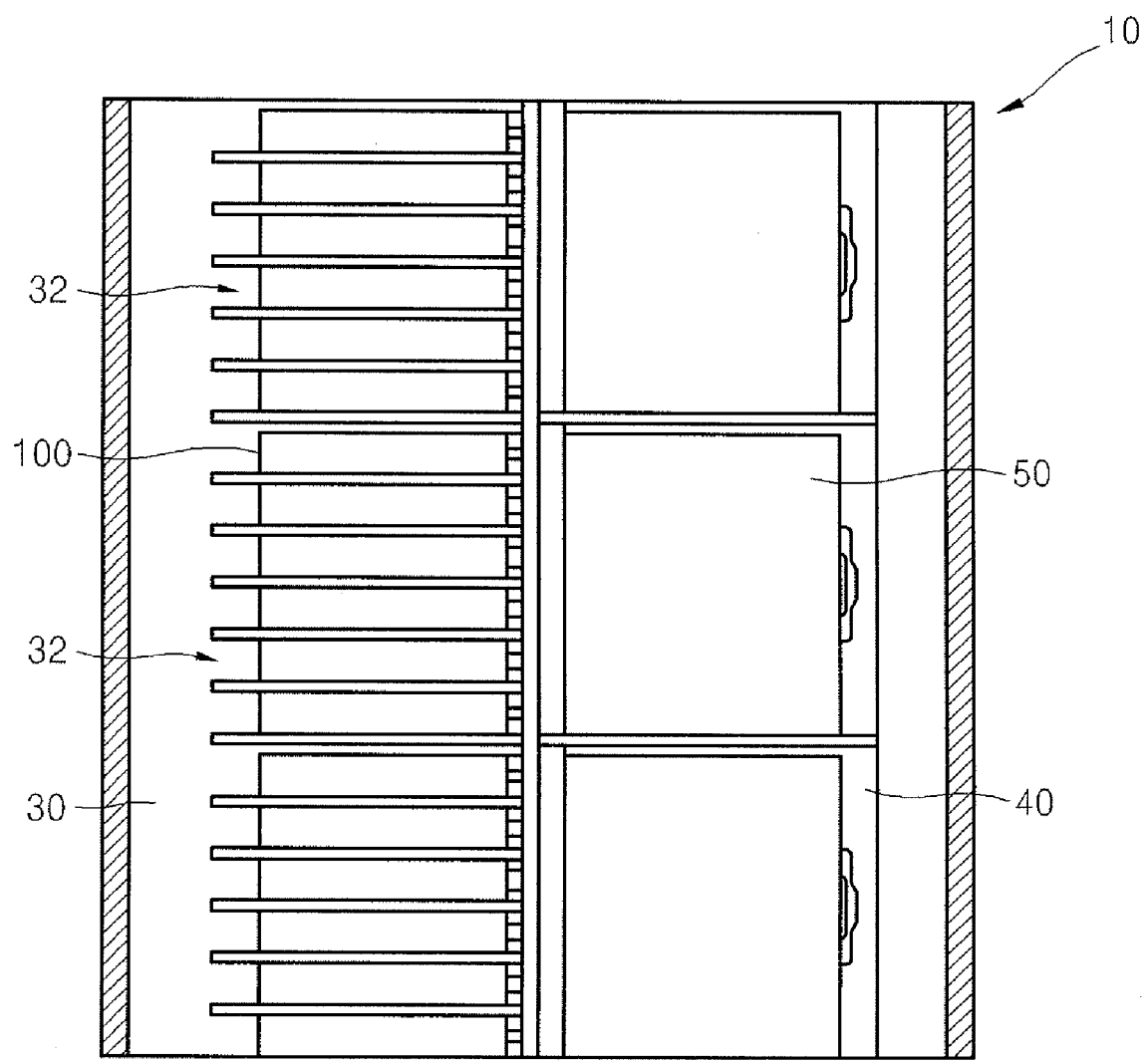
FIG. 1 is schematic view illustrating a burn-in test apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is schematic view illustrating a burn-in test apparatus 10 according to an embodiment of the present general inventive concept.

Referring to FIG. 1, the burn-in test apparatus 10 includes a burn-in chamber 30 where hard disc drives (HDDs) 100 are loaded in a front side of the burn-in test apparatus 10 and a control chamber 40 that controls a burn-in test in a rear side of the burn-in test apparatus 10. The burn-in chamber 30 includes a plurality of cells 32 and each HDD 100 is loaded in each of the cells 32. The control chamber 40 includes test computers 50 that control and monitor the HDDs 100.

Figure 2:
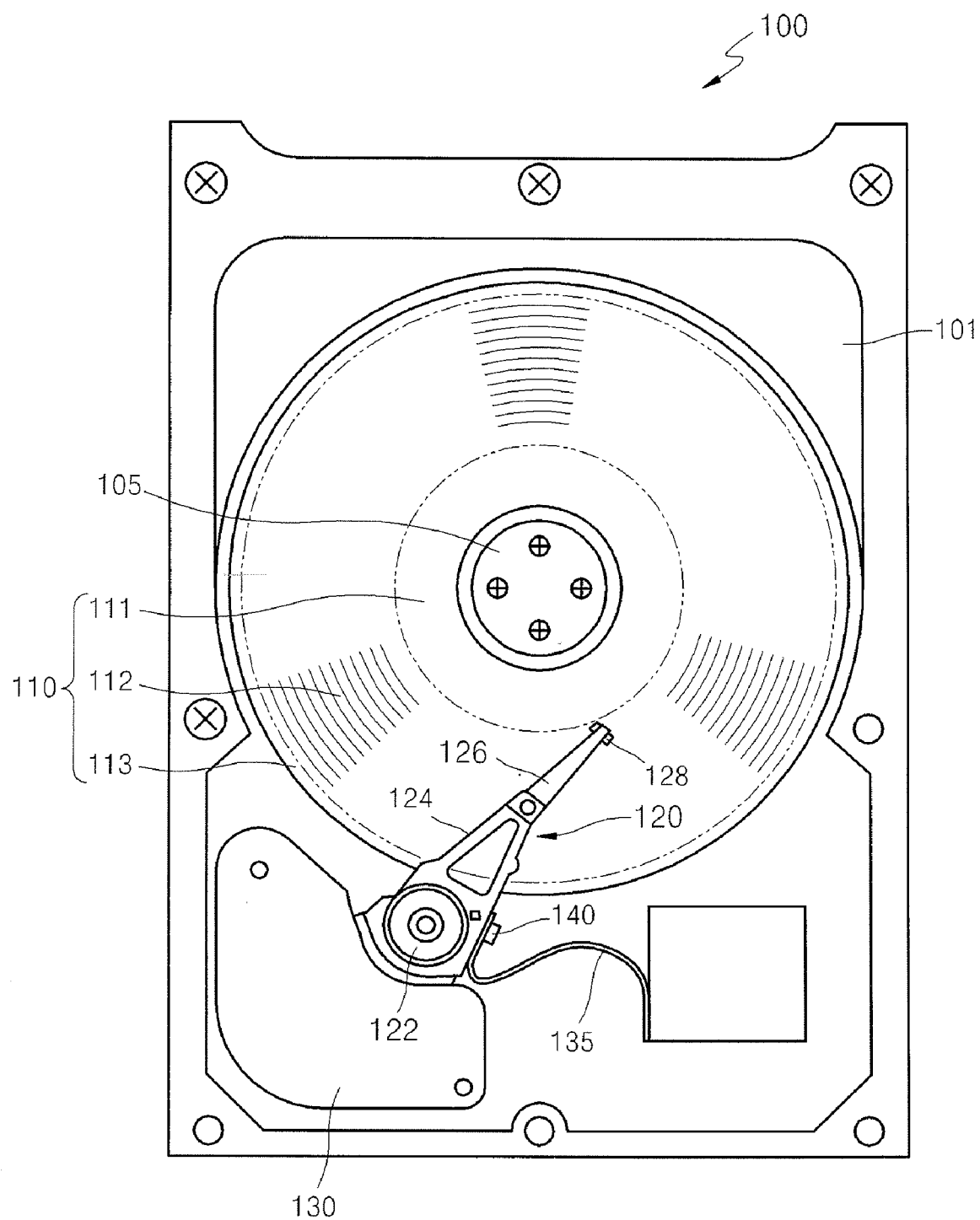
FIG. 2 is a plan view illustrating a hard disc drive (HDD) according to an embodiment of the present general inventive concept.

FIG. 2 is a plan view illustrating one of the HDDs 100 of FIG. 1 according to an embodiment of the present general inventive concept.

Referring to FIG. 2, the HDD 100 includes a spindle motor 105, a magnetic disc 110 as a data storage medium, a head stack assembly (HSA) 120, and a voice coil motor (VCM) block 130 in a housing that comprises a base member 101 and a cover member (not shown) that is coupled to the base member 101.

The spindle motor 105 rotates the magnetic disc 110 and is fixedly mounted on the base member 101. The magnetic disc 110 is coupled to the spindle motor 105 to rotate at a high speed, and includes a parking region 111 where a slider 128 mounted on an end portion of the HSA 120 can park when the HDD 100 is not in operation, a recording region 112 where data can be recorded, and a maintenance cylinder 113 where a parameter of a read signal or a parameter of a write signal obtained through the burn-in test can be stored.

The HSA 120 includes the slider 128 on which a magnetic head (not illustrated) that writes or reproduces data. The magnetic head moves to a certain track to write data on the magnetic disc 110 or reproduces data recorded on the magnetic disc 110. The HSA 120 includes a swing arm 124, a suspension 126 fixedly coupled to the swing arm 124, and the slider 128 which is attached to the end portion of the suspension 126. The HSA 120 is rotatably mounted on the base member 101 with respect to a rotation shaft 122.

If the magnetic disc 110 rotates at a high speed on the base member 101, a lifting force acts on the slider 128. The slider 128 maintains a floating state at a height where the lifting force and an elastic pressure of the suspension 126 that applies a pressure to the slider 128 to face the magnetic disc 110 equilibrate. In the floating state of the slider 128 according to the balance of the lifting force and the elastic force, the magnetic head formed on the slider 128 performs the function of reproducing or writing data on the magnetic disc 110.

The VCM block 130 includes magnets (not shown) disposed on upper and lower sides of a voice coil (not shown) provided on a rear end of the HSA 120 and a yokes that support the magnets. The voice coil, the magnets, and the yokes constitute a voice coil motor that provides a rotational force to the HSA 120. The voice coil motor is controlled by a servo control system, and rotates the HSA 120 in a direction that follows the Fleming's left hand rule due to the mutual action between a current inputted to the voice coil and a magnetic field formed by the magnets.

The spindle motor 105, the magnetic head (not shown) formed on the slider 128, and the voice coil (not shown) are electrically connected to a main circuit board (not shown) attached to a lower surface of the base member 101. An electric circuit formed on the main circuit board functions as a controller for controlling the spindle motor 105, the magnetic head, and the voice coil motor. A flexible printed circuit 135 is a medium that electrically connects between the main circuit board and the HSA 120. A temperature sensor 140 is formed on a side of the HSA 120 to measure an internal temperature of the HDD 100. The temperature sensor 140 can include a thermistor, and can be formed on a pre-amplifier for amplifying a signal.

The temperature sensor 140 may be disposed at a position inside the HDD 100, for example, close to the HAS 120 to detect the internal temperature of an inside space of the HDD 100.

The detected or measured temperature is transmitted to an external device, for example, the test computer 50 disposed in the control chamber 40 to determine whether the corresponding HDD is an abnormal HDD or has a defect according to the temperature, through the PCB 135 and/or the main circuit board of the base member 101. The HDD 100 may be an HDD apparatus having a terminal (not illustrated) and a cable (not illustrated) to connect the terminal and the test computer 50, so that a signal representing the temperature is transmitted from the HDD apparatus to the test computer 50. The test computer 50 may have a controller to adjust a BER criterion according to the measured temperature, calculate a BER according to the adjusted BER, and to generate a signal representing that the corresponding HDD apparatus is an abnormal HDD or has a defect according to the temperature and a reference, according to the calculated BER. It is possible that the test computer 50 may have a display to display a list of one or more HDD apparatus according to the signal.

The HDD may be an HDD apparatus having a controller to receive the measured temperature, to adjust a reference BER criterion to another BER criterion according to the temperature, and to transmit the adjusted BER criterion to the test computer 50, so that the test computer calculates a BER and determines whether the HDD is normal according to the calculated BER and a burn-in temperature. It is also possible that the HDD may be an HDD apparatus having a controller to receive the measured temperature, to adjust a reference BER criterion to another BER criterion according to the temperature, to calculate a BER according to the adjusted BER criterion and a burn-in temperature, and to transmit a signal representing a state of the HDD apparatus to the test computer 50 according to the calculated BER and a reference.

Figure 3:
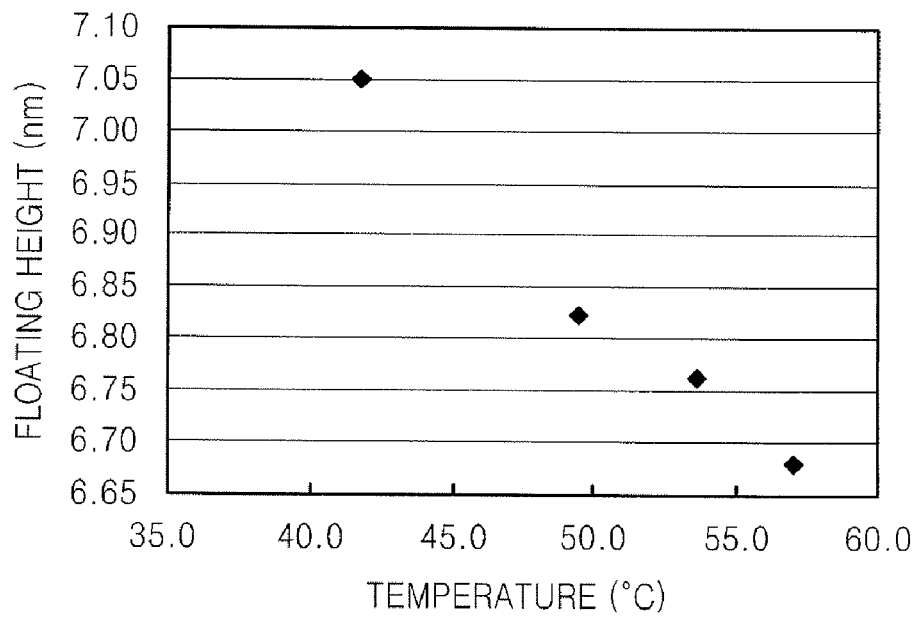
FIG. 3 is a graph illustrating a floating height of a slider according to a temperature of an HDD.
Figure 4:
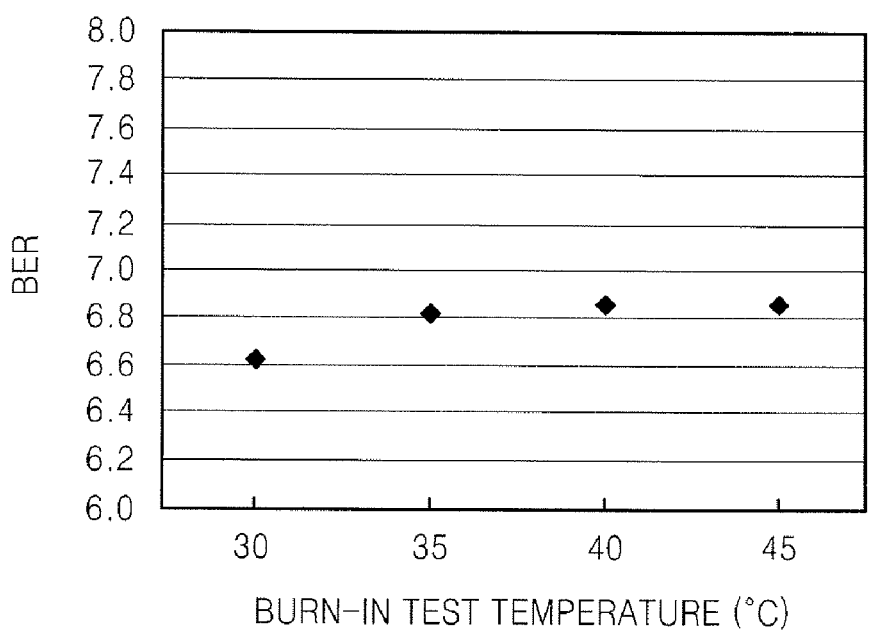
FIG. 4 is a graph illustrating a bit error rate (BER) of an HDD according to a burn-in test temperature.
Figure 5:
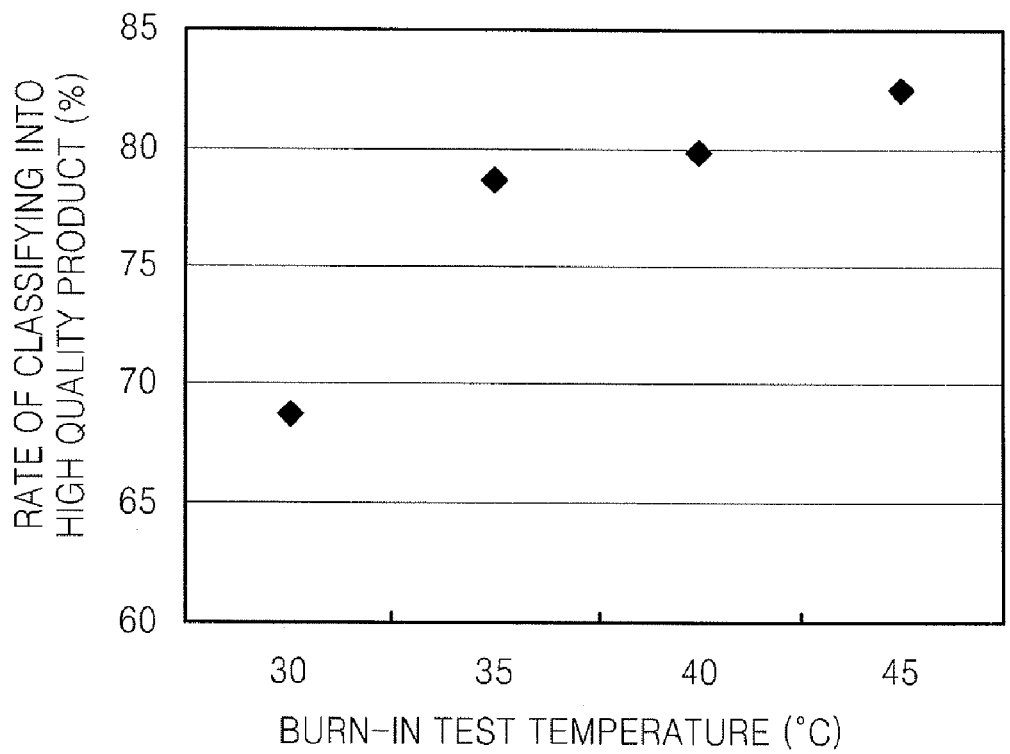

FIG. 3 is a graph illustrating a floating height of a slider according to a temperature of an HDD, FIG. 4 is a graph illustrating a BER of an HDD according to a burn-in test temperature, and FIG. 5 is a graph illustrating a rate of determining a high quality HDD according to a burn-in test temperature.

Referring to FIGS. 2 and 3, a floating height of the slider 128 indicates that the slider is spaced-apart from the magnetic disc 110 by a distance representing that the slider 128 (refer to FIG. 2) of the HDD 100 (refer to FIG. 2) is lifted relative to a surface of the magnetic disc 110, and the floating height is reduced as the temperature of the HDD 100 increases due to the fact that air expands, and thus, the density of air is reduced as the temperature of the HDD 100 increases.

Referring to FIGS. 2, 3, and 4, it can be seen that as the burn-in test temperature increases, the BER increases. The BER means the rate of generating an error when a digital signal is transmitted, and as the BER value increases in the HDD 100, the rate of generating the error is reduced. The reason why the BER increases as the burn-in test temperature increases is due to the fact that, as illustrated in FIG. 3, when the burn-in test temperature increases, the floating height of the slider 128 is reduced (illustrated in FIG. 3), and, as a result, the writing and reproducing characteristics of the slider 128 are increased.

Referring to FIGS. 2 through 5, it can be seen that as the burn-in test temperature increases, a rate of classifying of the HDD 100 a high quality products increases. In a conventional test apparatus, a certain BER criterion is applied to all the HDDs regardless of the burn-in test temperature. And, if a BER of a produced HDD is lower than the BER criterion, the produced HDD is classified as a low-quality product, while if a BER of a produced HDD is equal to or greater than the BER criterion, the produced HDD is classified as a high quality product. As described with reference to FIG. 4, since the BER increases as the burn-in test temperature increases, there is a high possibility that a BER of an HDD obtained at a high burn-in test temperature can be greater than a particular BER criterion, for example, a BER of 4.5, and thus, the rate of classifying of the HDD 100 into high quality products increases. However, the increased rate of classifying of the HDD 100 into high quality products at the high burn-in test temperature does not mean substantially an increase in the rate of producing high quality products, and instead, it can reduce the reliability of products sold. On the contrary, if the burn-in test temperature is low, since the rate of classifying into high quality products is reduced, productivity can be reduced, and thereby, increasing manufacturing costs.

In order to reduce the error of classifying into a high quality or a low quality product according to the variation of the burn-in test temperature, the present invention provides a method of setting up a BER criterion that can be changed according to the change of the temperature of the HDD 100, and a method of performing a burn-in test using the BER criterion setting up method.

Figure 6:
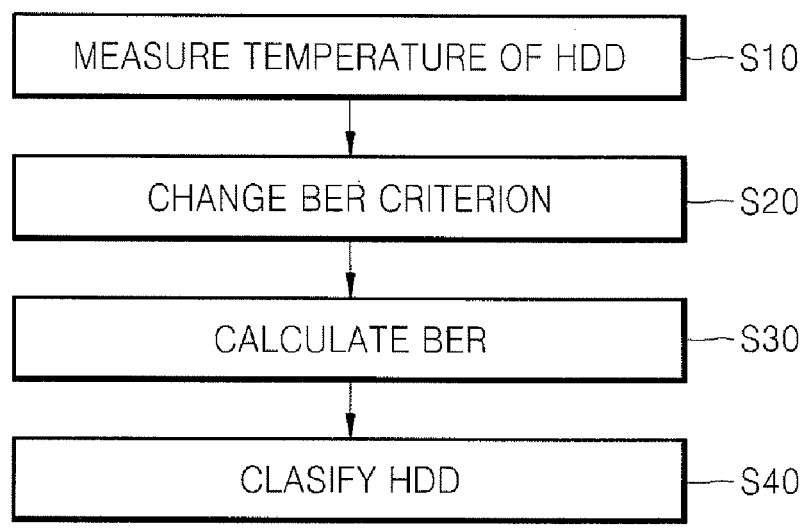
FIG. 6 is a flow chart illustrating a method of performing a burn-in test according to an embodiment of the present general inventive concept.

FIG. 6 is a flow chart illustrating a method of performing a burn-in test according to an embodiment of the present general inventive concept. Referring to FIG. 6, the method of performing a burn-in test according to the present embodiment includes the method of setting up the BER criterion. First, the HDDs 100 are uploaded onto the cells 32 of the burn-in test apparatus 10 as depicted in FIG. 1, and each of the HDDs 100 are connected to test computers 50. The test computers 50 measure the temperatures of the HDDs 100 uploaded onto each of the cells 32 (S10). The temperature of each of the HDDs 100 is measured using the temperature sensor 140 (refer to FIG. 2) included in each of the HDDs 100.

Then, the BER criterion that is to be applied to individual HDD 100 is changed based on the measured temperature of the HDD 100. More specifically, if the temperature of the HDD 100 is higher than an optimum temperature for the burn-in test, a BER criterion is set up with a value greater than the BER criterion (for example, a BER criterion of 4.5) of the optimum temperature. On the contrary, if the temperature of the HDD 100 is lower than an optimum temperature for the burn-in test, a BER criterion is set up with a value less than the BER criterion (for example, a BER criterion of 4.5) of the optimum temperature. The optimum temperature can be determined within a range, for example, "from X to Y". If the measured temperature of the HDD 100 lies within the range of the optimum temperature for the burn-in test, the BER criterion is unchanged.

The method of performing a burn-in test according to an embodiment of the present invention includes an operation of calculating the BER of an individual HDD 100 (S30) and an operation of classifying the individual HDD 100 into a high quality product or a low quality product (S40) after the BER criterion of each of the HDDs 100 is set up as described above. The BER is automatically calculated by the operation of the test computer 50 (refer to FIG. 1). The operation of calculating the BER includes writing test data using a test signal in a bit cell which is a recording area of the magnetic disc 110, reproducing the data recorded in the bit cell, and counting bit cells where an error of reproducing the data occurs.

The HDD 100 is classified as being high quality or low quality by the following method (S40). More specifically, if the calculated BER of the individual HDD 100 is less than the newly set up BER criterion in operation S20, the individual HDD 100 is classified as a low quality product. However, if the calculated BER of the individual HDD 100 is equal to or greater than the newly set up BER criterion in operation S20, the individual HDD 100 is classified as a high quality product.

According to the present general inventive concept, a BER criterion is changed based on a temperature of an HDD when the HDD is burn-in tested, and the HDD is classified as a high quality or low quality product using the changed BER criterion. Accordingly, a certain yield rate level of high quality products can be achieved, and a high reliability level of products classified as high quality can be maintained.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting up a bit error rate (BER) criterion in a hard disk drive (HDD) apparatus, the method comprising:
    measuring a temperature of an HDD; and
    changing a BER criterion in which a new BER criterion having a value greater than reference BER criterion of an optimum temperature is set up if the measured temperature of the HDD is higher than an optimum temperature for a burn-in test, and a new BER criterion having a value less than the reference BER criterion of the optimum temperature is set up if the measured temperature of the HDD is lower than an optimum temperature for a burn-in test.

2. The method of claim 1, wherein the measuring of the temperature of the HDD is performed using a temperature sensor provided in the HDD.

3. A method of performing a burn-in test of a hard disk drive (HDD) in a hard disk drive (HDD) apparatus, the method comprising:
    measuring temperatures of at least one HDD;
    changing a bit error rate (BER) criterion in which a new BER criterion having a value greater than a reference BER criterion of an optimum temperature is set up if the measured temperature of the HDD is higher than an optimum temperature for a burn-in test, and a new BER criterion having a value less than the reference BER criterion of the optimum temperature is set up if the measured temperature of the HDD is lower than an optimum temperature for a burn-in test,
    calculating a BER of the HDD; and
    classifying the HDD into one of a low quality product if the calculated BER of the HDD is less than the newly set up BER criterion, and a high quality product if the calculated BER of the HDD is equal to or greater than the newly set up BER criterion.

4. The method of claim 3, wherein the at least one HDD comprises a plurality of HDDs to be uploaded onto a burn-in test apparatus, and each of the operations are performed on the respective HDDs.

5. The method of claim 3, wherein the measuring of the temperature of at least one HDD is performed using a temperature sensor provided in the HDD.

6. A method of testing a hard disk drive (HDD) in a hard disk drive (HDD) apparatus, the method comprising:
    measuring a temperature of an HDD;
    adjusting a bit error rate (BER) criterion according to the measured temperature of the HDD and a reference temperature to be used to test a state of the HDD; and
    performing a burn-in test on the HDD to determine the state of the HDD,
    wherein the performing of the burn-in test comprises calculating a BER according to the adjusted BER criterion.

7. The method of claim 6, wherein the calculating of the BER comprises:
    recording data of the calculated BER in one or more bit cells of a disc of the HDD;
    reproducing the recorded data from the one or more bit cells; and
    counting one or more bit cells to contain an error.

8. The method of claim 7, further comprising:
    classifying the HDD as one of a high quality HDD and a low quality HDD according to the counted one or more bit cells.

9. The method of claim 6, wherein the measuring of the temperature of the HDD comprises
    measuring the temperature using a temperature sensor disposed inside the HDD before performing a burn-in test.

10. A hard disk drive (HDD) apparatus, comprising:
    a member to define an inside space, and having a disc and an HSA to read data and record data from and on the disc;
    a temperature sensor disposed in the inside space of the member to detect an internal temperature of an HDD; and
    a controller to adjust a bit error rate (BER) criterion according to the measured temperature of the HDD and a reference temperature to be used to test a state of the HDD,
    wherein the controller performs a burn-in test on the HDD to determine the state of the HDD and calculates a BER according to the adjusted BER criterion.

11. The apparatus of claim 10, wherein the controller records data of the calculated BER in one or more bit cells of a disc of the HDD, reproduces the recorded data from the one or more bit cells, and counts one or more bit cells to contain an error, so as to determine the state of the HDD.

12. The apparatus of claim 11, wherein the controller classifies the HDD as one of a high quality HDD and a low quality HDD according to the counted one or more bit cells.

13. The apparatus of claim 10, wherein the temperature sensor is mounted on the HSA to detect the temperature representing an ambient air temperature between the HSA and the disc.

14. The apparatus of claim 10, wherein the temperature sensor is disposed adjacent to the HSA to detect the temperature representing an ambient air temperature between the HSA and the disc.

15. The apparatus of claim 10, wherein the controller generates a signal representing the state of the HDD according to the adjusted BER and a reference temperature.

* * * * *